(12) United States Patent
Roderick (10) Patent No.: US 6,601,404 B1
(45) Date of Patent: Aug. 5, 2003

(54) COOLING DEVICE

(75) Inventor: Kevin H. Roderick, Albuquerque, NM (US)

(73) Assignee: Nanopore, Inc., Albuquerque, NM (US)

( * ) Notice: Subject to any disclaimer, the term of this patent is extended or adjusted under 35 U.S.C. 154(b) by 0 days.

(21) Appl. No.: 10/046,661

(22) Filed: Oct. 26, 2001

Related U.S. Application Data (63) Continuation-in-part of application No. 09/932,264, filed on Aug. 17, 2001.

(51) Int. Cl.[7] ............................................. F25B 17/08
(52) U.S. Cl. ................................. 62/480; 62/457.9
(58) Field of Search ....................... 62/480, 476, 101, 62/457.9; 165/104.12

(56) References Cited

U.S. PATENT DOCUMENTS

| | | | |
|---|---|---|---|
| 2,088,276 A | | 7/1937 | Nesselmann et al. .......... 62/118 |
| 3,227,208 A | | 1/1966 | Potter, Jr. et al. .............. 165/96 |
| 4,048,810 A | * | 9/1977 | Zeilon .......................... 62/101 |
| 4,205,531 A | | 6/1980 | Brunberg et al. ............. 62/101 |
| 4,250,720 A | | 2/1981 | Siegel ........................... 62/480 |
| 4,314,566 A | | 2/1982 | Kiwak .................... 128/204.15 |
| 4,586,500 A | | 5/1986 | Glynn .................... 128/204.15 |
| 4,635,629 A | | 1/1987 | Thorp et al. ............ 128/202.26 |
| 4,736,599 A | | 4/1988 | Siegel ........................... 62/294 |
| 4,742,868 A | * | 5/1988 | Mitani et al. ........... 165/104.12 |
| 4,752,310 A | | 6/1988 | Maier-Laxhuber et al. ...... 62/4 |
| 4,759,191 A | | 7/1988 | Thomas et al. ................ 62/101 |
| 4,928,495 A | | 5/1990 | Siegel ............................... 62/4 |
| 5,038,581 A | | 8/1991 | Maier-Laxhuber et al. 62/457.9 |
| 5,048,301 A | | 9/1991 | Sabin et al. ................... 62/101 |
| 5,111,668 A | | 5/1992 | Parrish et al. .............. 62/259.3 |
| 5,113,666 A | | 5/1992 | Parrish et al. .............. 62/259.3 |
| 5,201,365 A | * | 4/1993 | Siegel ........................... 165/46 |
| 5,263,336 A | | 11/1993 | Kuramarohit .............. 62/259.3 |
| 5,269,293 A | * | 12/1993 | Loser et al. ........... 128/204.15 |
| 5,289,695 A | | 3/1994 | Parrish et al. .............. 62/259.3 |
| 5,291,750 A | | 3/1994 | Parrish et al. .............. 62/259.3 |
| 5,291,942 A | | 3/1994 | Ryan ...................... 165/104.12 |
| 5,309,985 A | | 5/1994 | Erickson ................ 165/104.12 |
| 5,440,896 A | | 8/1995 | Maier-Laxhuber et al. ... 62/269 |
| 5,628,205 A | | 5/1997 | Rockenfeller et al. ......... 62/480 |
| 5,660,049 A | | 8/1997 | Erickson ....................... 62/107 |
| 5,802,870 A | | 9/1998 | Arnold et al. ................. 62/480 |
| 5,816,069 A | | 10/1998 | Ebbeson .................... 62/457.9 |
| 6,105,382 A | | 8/2000 | Reason .......................... 62/259 |
| 6,438,992 B1 | | 8/2002 | Smith et al. ................... 62/480 |

OTHER PUBLICATIONS

Pending Patent Application 09/876,841; Entitled "Temperature–Controlled Shipping Container and Method for Using Same"; Filing Date Jun. 6, 2001; Smith et al.
Pending Patent Application 09/970,094; Entitled "Cooling Device and Temperature–Controlled Shipping Container Usint Same"; Filing Date Oct. 2, 2001; Smith et al.
Pending Patent Application 09/932,264; Entitled "Cooling Device"; Filing Date Aug. 17, 2001; Smith et al.
Pending Patent Application 10/165,753; Entitled "Temperature Controlled Shipping Containers"; Filing Date Jun. 6, 2002; Smith et.
Pending Patent Application 10/165,758; Entitled "Sorption Cooling Devices"; Filing Date Jun. 6, 2002; Smith et al.
Pending Patent Application 09/691,371; Entitled "Desiccant Composition"; Filing Date Octiber 18, 2000 et al..

* cited by examiner

*Primary Examiner*—Melvin Jones
(74) *Attorney, Agent, or Firm*—Marsh Fischmann & Breyfogle LLP (57) ABSTRACT

A sorption cooling device adapted to cool a gas or liquid flowing through a conduit. The cooling device has a high cooling density and a user can independently control the cooling rate. The cooling device can be incorporated in a number of apparatus and in one embodiment is incorporated in a personnel cooling apparatus, such as a closed-loop breathing apparatus or a body cooler.

9 Claims, 11 Drawing Sheets

COOLING DEVICE

CROSS-REFERENCE TO RELATED APPLICATIONS

This is a continuation-in-part application of U.S. patent application Ser. No. 09/932,264 filed on Aug. 17, 2001.

BACKGROUND OF THE INVENTION

1. Field of the Invention

The present invention relates to a cooling device that is adapted to cool a gas or a liquid flowing through a conduit. The cooling device can be utilized in a personnel cooling apparatus such as a rebreather or a body cooling suit. The cooling device is lightweight and has a high cooling density.

2. Description of Related Art

Cooling devices such as those used to cool breathable air and to cool the body of a user are known in the prior art. For example, breathing devices are often utilized to protect a user from unacceptable air conditions in the environment surrounding the user. Firemen and military personnel utilize such breathing devices in hostile environments and the breathing device is often incorporated into a hazardous materials (Haz-Mat) suit. The breathing device can be an open-loop breathing device that continuously provides air from a fresh air source or can be a closed-loop breathing device that recycles the gas expired by the user.

An open-loop breathing device includes a canister of oxygen for supplying fresh oxygen to the user and the expired gas from the user is vented to the atmosphere. A closed-loop system is smaller and has a reduced weight as compared to an open-loop system. A closed-loop system includes an oxygen canister, which is generally smaller that the canister used in an open-loop system, and also includes a carbon dioxide ($CO_2$) absorber. The expired gas from the user is recirculated through the $CO_2$ absorber and oxygen is added to the recirculated gas to form a breathable gas composition.

These breathing devices are often used in an uncomfortably hot atmosphere, such as when battling a fire, creating great discomfort for the user. Further, in a closed-loop system, the $CO_2$ absorber generates heat during the absorption process and therefore the recycled gas becomes warmer over time. Therefore, the recycled air should be cooled to enhance the comfort of the user and, in severe cases, to prevent serious respiratory injury or even death.

U.S. Pat. No. 4,314,566 by Kiwak discloses a closed-loop breathing apparatus that includes a heat exchanger for cooling the breathing gas. A heat sink is located inside the oxygen tank and a heat pipe connects the heat sink to a heat exchange element located outside of the tank and in contact with the stream of recycled breathing gas. As the high-pressure oxygen tank is discharged, the tank cools and the heat exchange element thereby cools the recycled breathing gas.

U.S. Pat. No. 4,586,500 by Glynn discloses a closed-loop breathing apparatus wherein the breathing tube is passed through a reservoir of boiling liquid that is open to the atmosphere. The boiling liquid cools the recycled breathing gas.

U.S. Pat. No. 4,635,629 by Thorp et al. discloses a breathing apparatus including a $CO_2$ absorber. The breathing apparatus incorporates an evaporative cooler unit wherein water evaporates from the surface of a fabric as the recycled breathing gas flows over the fabric.

U.S. Pat. No. 5,269,293 by Löser et al. discloses a cooling apparatus for cooling breathing gas in a closed-loop system that includes an oxygen tank and a $CO_2$ absorber. A sorption cooling unit cools the breathing gas before inhalation by the user. The sorption cooling unit includes a plurality of storage tanks to hold water and includes a zeolite based desiccant for adsorption of evaporated water. Water evaporates from the storage tanks thereby cooling the breathing gas stream and the water vapor is adsorbed by the zeolite in a separate adsorbent container. The adsorbent container is subdivided into a plurality of sections to facilitate the removal of heat from the absorbent. A valve is also provided between the water storage tanks and the adsorbent container to enable the user to periodically open and shut the connection between the storage tank and the adsorbent container.

In addition to a breathing apparatus, cooling devices have also been utilized to provided cooling directly to the body of the user through a cooled body suit. Examples of such devices are illustrated in U.S. Pat. No. 6,105,382 by Reason and U.S. Pat. No. 5,263,336 by Kuramarohit.

U.S. Pat. No. 5,291,750 by Parrish et al. discloses a micro-climate heating/cooling device that can be used to heat or cool a vest worn by a user. The heating/cooling device includes an evaporative cooler having an evaporator and an adsorption bed with a control valve disposed between the evaporator and the adsorption bed. Liquid is circulated through the vest and to an evaporator heat exchanger to cool the liquid.

Despite the foregoing, there remains a need for a lightweight cooling device for cooling a gas flow or a liquid flow. It would be advantageous if such a device could provide a high degree of cooling over an extended period of time and the cooling rate could be independently controlled by the user.

SUMMARY OF THE INVENTION

According to one embodiment, the present invention is directed to a cooling device that is adapted to cool a medium flowing through a conduit. The medium can be a gas such as a breathing gas or a liquid such as water.

According to a preferred embodiment, the cooling device includes an evaporative chamber disposed adjacent to a conduit and separated therefrom by a sidewall. A refrigerant liquid is disposed in the evaporative chamber. An adsorptive chamber is connected to the evaporative chamber by a vapor passageway, wherein refrigerant liquid evaporates in the evaporative chamber under reduced pressure and extracts heat through the sidewall from a medium flowing through the conduit. The gas flow is advantageously cooled without restricting the flow of the medium through the conduit. This can be particularly important in a rebreather apparatus where the breathing gas should flow easily through the conduit to minimize stress on the user.

According to another preferred embodiment, the cooling device includes an evaporative chamber disposed in thermal communication with a conduit, a liquid reservoir, means for supplying a refrigerant liquid from the liquid reservoir to the evaporative chamber and an adsorptive chamber connected to an evaporative chamber by a vapor passageway. Refrigerant liquid evaporates in the evaporative chamber and extracts heat through the first sidewall from a medium flowing through the conduit. By providing a liquid reservoir that is separate from the evaporative chamber, the flow of refrigerant liquid can be controlled, such as by using a valve. The reservoir can also be attached and detached from the cooling device to provide fresh refrigerant liquid to the cooling device. In one embodiment, the liquid reservoir is a flexible pouch, such as a plastic pouch that collapses upon removal of the liquid and is readily disposable.

According to another preferred embodiment, the cooling device includes an evaporative chamber in thermal communication with a conduit, a refrigerant liquid disposed within the evaporative chamber and an adsorptive chamber connected to the evaporative chamber by a vapor passageway, wherein the cooling device has a cooling density of at least about 600 J/g. When calculating the cooling density herein, the mass is taken as the mass of refrigerant liquid plus the mass of desiccant. A cooling device having such a high cooling density advantageously provide as high degree of cooling over an extended period of time. According to one embodiment, the cooling density is even higher, such as at least about 800J/g.

According to another embodiment of the present invention, a cooling device is provided that includes an evaporative chamber adapted to contain a refrigerant liquid, an adsorptive chamber including a desiccant and a vapor passageway adapted to provide refrigerant liquid vapor from the evaporative chamber to the adsorptive chamber upon evaporation of a refrigerant liquid. The adsorptive chamber includes active cooling means, wherein the active cooling means extracts heat from the desiccant upon adsorption of refrigerant liquid vapor by the desiccant. By cooling the desiccant, which rises in temperature due to the heat of adsorption, the desiccant is able to adsorb additional quantities of refrigerant liquid and therefore provide enhanced cooling. The active cooling means can include, for example, a separate sorption cooler.

These and other embodiments of the present invention will become apparent from the following description of the invention.

DETAILED DESCRIPTION OF THE INVENTION

The present invention relates to a cooling device for the cooling of a medium flowing through a conduit, such as a gas stream or a liquid stream. The cooling device of the present invention can be incorporated in a personnel cooling apparatus such as a rebreather or a cooled body suit. The present invention also relates to an improved sorption cooling device that is useful for cooling a gas or liquid stream for similar applications.

The cooling device according to the present invention is referred to as a sorption cooling device. The fundamental operating principles of a sorption cooling device are well known. A substantial reduction in pressure over a refrigerant liquid (e.g., water) will promote evaporation of the liquid and the evaporating liquid will absorb heat from its surroundings. To prevent the development of high vapor pressure over the refrigerant liquid, which would stop the evaporation of the liquid, the vapor that is generated must be continuously removed. Thus, an adsorbent such as a desiccant can be utilized to adsorb the vapor and permit the refrigerant liquid to continue evaporating and absorbing heat from the surrounding environment. An example of a sorption cooling device is described in U.S. Pat. No. 4,250,720 by Siegel, which is incorporated herein by reference in its entirety.

Figure 1:
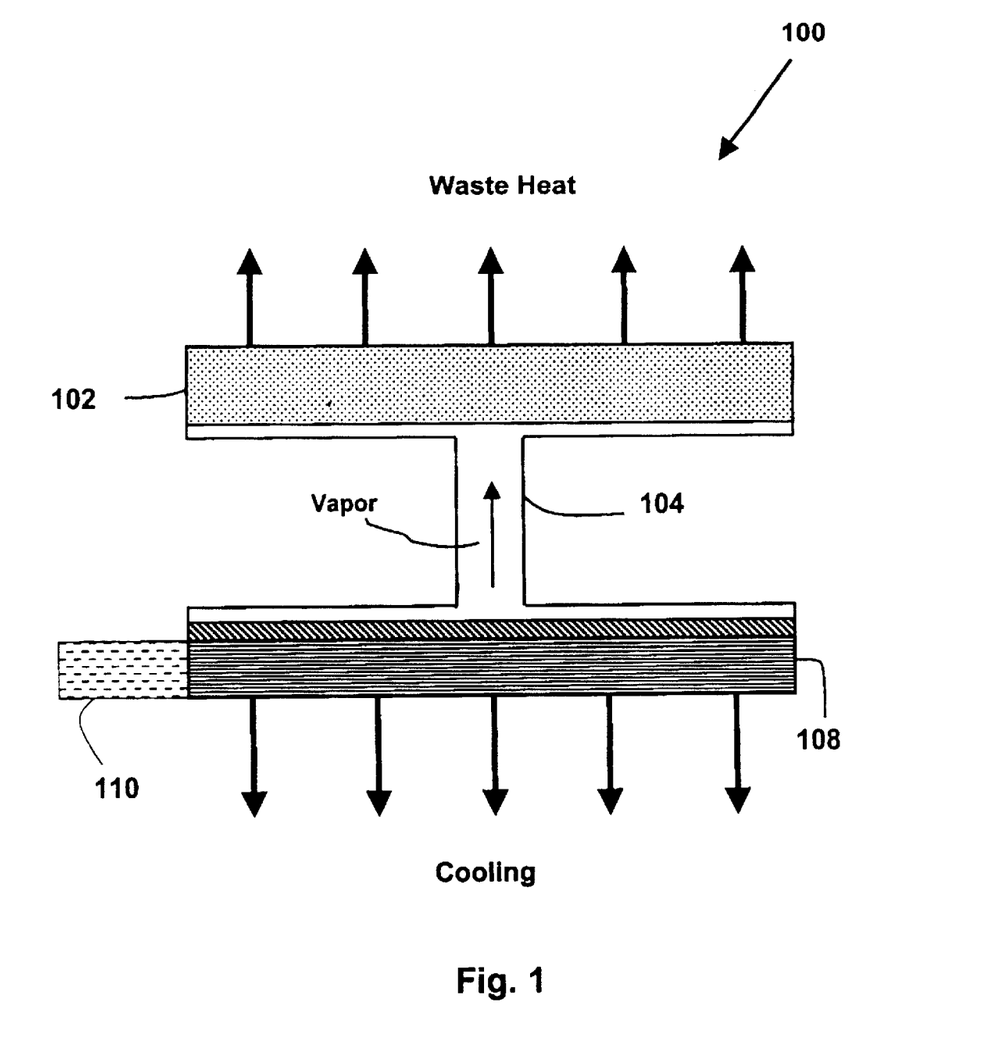
FIG. 1 illustrates a cross-sectional view of a sorption cooling device.

These fundamental principles can be understood by reference to FIG. 1, which illustrates a cross-sectional view of a simple sorption cooling device. The sorption cooling device 100 includes an adsorptive chamber 102 and an evaporative chamber 108 with a vapor passageway 104 disposed between the evaporative chamber 108 and the adsorptive chamber 102. A liquid reservoir 110 provides a source of refrigerant liquid that is delivered to the evaporative chamber 108 upon release of the refrigerant liquid from the reservoir 110. The refrigerant liquid evaporates in the evaporative chamber 108 thereby providing cooling to that side of the device. The vapor passes through the vapor passageway 104 and is adsorbed by a desiccant located within the adsorptive chamber 102. Upon adsorption of the vapor, the desiccant releases heat that is at least equal to the amount of heat removed by the evaporative chamber.

In order for the released refrigerant liquid to evaporate, the sorption cooling device 100 is maintained at a reduced pressure and preferably is maintained under a substantial vacuum, such as a pressure of not greater than about 4 mbar.

One embodiment of the present invention is directed to the use of a sorption cooling device to cool a flowing medium, such as a gas stream of breathable gas in a closed-loop breathing apparatus. Such breathing apparatus are illustrated in U.S. Pat. No. 5,269,293 by and U.S. Pat. No. 4,586,500 by Glynn, each of which is incorporated herein by reference in its entirety.

Figure 2:
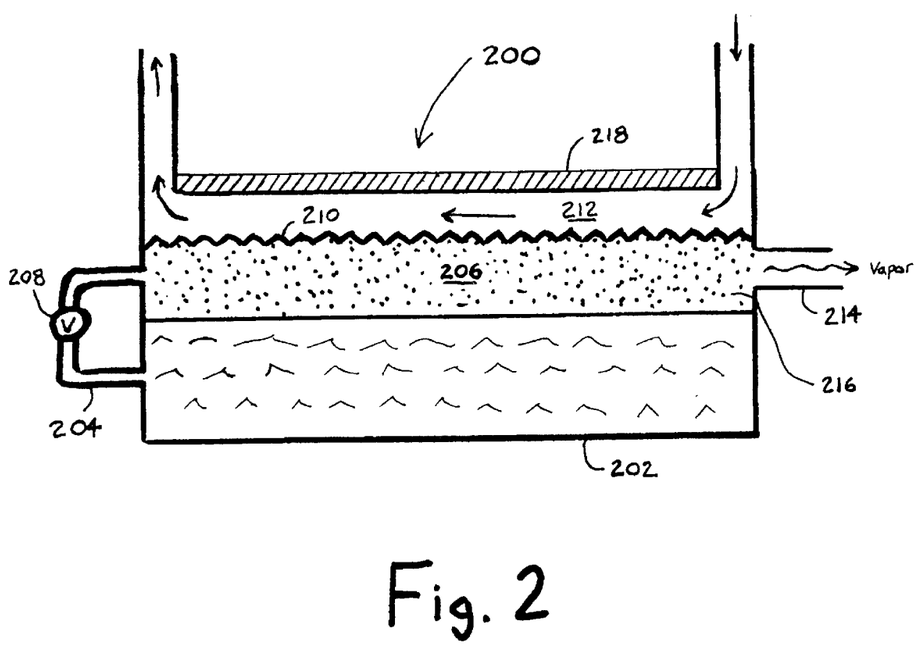
FIG. 2 illustrates a cross-sectional view of a sorption cooling device for cooling a flowing medium according to an embodiment of the present invention.

FIG. 2 illustrates a sorption cooling device including an evaporative chamber for cooling a flowing medium such as air according to an embodiment of the present invention. The cooling device 200 includes an evaporative chamber 206 that is connected to a liquid reservoir 202 by a liquid channel 204. A valve 208 preferably controls the flow of refrigerant liquid from the liquid reservoir 202 to the evaporative chamber 206. Preferably, the valve 208 can be operated by the user to turn the flow of refrigerant liquid on and off as well as to regulate the flow rate of liquid to the evaporative chamber 206. The valve 208 can also be thermostatically controlled to regulate the liquid flow, and hence the cooling, in response to a change in temperature in the medium or in the surrounding environment.

It is an advantage of the present invention that the valve 208 is disposed between the liquid reservoir and the evaporative chamber 206. Prior art devices typically employ a valve that is disposed between the evaporative chamber and the absorptive chamber and restricts the flow of vapor. By placing a valve between the liquid reservoir and the evaporative chamber, there is no impediment or restriction on the flow of the vapor after it has evaporated in the evaporative chamber. Further, the use of a valve between the liquid reservoir and the evaporative chamber can provide an overall volume reduction in the device. That is, a valve to admit a small amount of liquid water will be intrinsically smaller than a valve that controls the flow of vapor, which has a volume of over 1,000 times that of the liquid.

Upon opening the valve 208 the refrigerant liquid, which is at substantially ambient pressure in the reservoir 202, is exposed to a substantially reduced pressure in the evaporative chamber 206. When the refrigerant liquid is water, the reduced pressure is preferably not greater than about 4 mbar to facilitate evaporation of the water. The evaporated refrigerant liquid can exit the evaporative chamber 206 via a vapor passageway 214 where it can be adsorbed in an adsorptive chamber (not illustrated).

An advantage of having a liquid reservoir disposed separate from the evaporative chamber is the increased transient response when the device is turned on, turned off, or is otherwise adjusted. In a cooling device such as those disclosed in the prior art where all of the evaporant liquid is held in the evaporative chamber, before the working medium (the liquid or gas you are trying to cool) can be cooled, all of the refrigerant liquid must be cooled first which adds thermal mass to the system. This means that the response time with respect to changes in the cooling requirements will be slow as all of the liquid changes temperature.

The evaporation of the refrigerant liquid in the evaporative chamber 206 causes the chamber to absorb heat from its surroundings. According to the present invention, a sidewall 210 is disposed between the evaporative chamber 206 and a conduit 212. The sidewall 210 is preferably made from a high thermal conductivity metal, such as copper or aluminum, and provides an airtight and liquid impermeable barrier between the evaporative chamber 206 and conduit 212. The sidewall 210 is preferably fabricated to include fins or the like to increase the surface area of the sidewall and hence increase the ability to absorb heat from the flowing medium. However, the sidewall 210 should not significantly restrict the flow of the medium through the conduit 212. The conduit 212 can also include an insulative material 218 on other sidewalls to insulate the flowing medium.

Refrigerant liquid that is not immediately vaporized can collect in the interstices of a wicking material 216 that can be disposed in the evaporative chamber 206. The wicking material 216 is configured to draw and maintain a desired amount of refrigerant liquid for vaporization. Thus, the wicking material should have a pore size that is sufficiently large to permit capillary action to draw the refrigerant liquid from the reservoir. Preferred wicking materials include materials such as microporous metals, porous plastics such as absorbent polymers (e.g., polyacrylamide or sodium polyacrylate), polyethylene and polypropylene, cellulose products and other hydroscopic materials. Hydrogels can also be used.

With the liquid to gas phase change, the refrigerant liquid removes heat from the medium flowing through the conduit 212 that is equal to the latent heat of vaporization of the refrigerant liquid. The vaporized liquid then passes through the vapor passageway 214 to be adsorbed in the adsorptive chamber (not illustrated). An optional vapor permeable membrane can be provided to prevent refrigerant liquid from migrating out of the vapor passageway 214. Examples of suitable membrane materials include various porous films such as TYVEK films (E. I. duPont deNemours Corporation, Wilmington, Del.) and GORETEX films (W. L. Gore and Associates, Newark, Del.). A thin film of polyurethane can also be used. Alternatively, the membrane may be a hydrophilic coating such as SCOTCHGUARD (3M Company). However, such a membrane is typically not required for the sorption cooling device of the present invention.

Refrigerant liquids for use in accordance with the present invention should have a high vapor pressure at ambient temperature so that a reduction of pressure will produce a high vapor production rate. Suitable refrigerant liquids include ammonia, various alcohols such as methyl alcohol or ethyl alcohol, ketones (e.g., acetone) or aldehydes (e.g., acetaldehyde. Other useful refrigerant liquids can include chlorofluorocarbons (CFC) or hydrochlorofluorocarbons (HCFC) such as FREON (E.I. Dupont de Nemours, Wilmington, Del.), a series of fluorocarbon products such as FREON C318, FREON 114, FREON 21, FREON 11, FREON 114B2, FREON 113 and FREON 112.

Preferably, the refrigerant liquid is an aqueous-based liquid and in a particularly preferred embodiment the refrigerant liquid consists essentially of water. Water is advantageous due to its high heat of vaporization, low cost and low toxicity. However, it may be desirable to include minor amounts of other components in the water in order to control the evaporative properties of the water. For example, the water can be mixed with a component having a low vapor pressure. Further, additives to lower the freezing point of the water can be used.

Suitable additive components could include ethyl alcohol, acetone, methyl alcohol, propyl alcohol and isobutyl alcohol, all of which are miscible with water. For example, a combination of a nucleating agent with a compatible liquid is a combination of 5 percent ethyl alcohol in water or 5 percent acetone in methyl alcohol.

The evaporated refrigerant liquid is adsorbed in an adsorptive chamber, preferably one that includes a desiccant. The desiccant must be capable of adsorbing and/or absorbing the vapor that is formed from the liquid. The mechanism by which the desiccant functions can be a combination of adsorption and absorption and as used herein, the terms adsorb, absorb, adsorption, absorption and the like refer to the retention of refrigerant liquid by the desiccant, regardless of the actual mechanism by which the liquid is retained. The desiccant is preferably of such a nature and quantity as to adsorb all of the vaporized refrigerant liquid. To enhance adsorption rates, the desiccant can be activated prior to introduction into the adsorptive chamber. Activation methods can include techniques such as heating the desiccant to remove moisture and/or any non-condensable gases.

Suitable desiccants include zeolites, barium oxide, activated alumina, silica gel, glycerine, magnesium perchlorate, calcium sulfate, calcium oxide, activated carbon, calcium chloride, glycerine silica gel, alumina gel, calcium hydride, phosphoric anhydride, phosphoric acid, potassium hydroxide and sodium sulfate.

A particularly preferred desiccant in accordance with the present invention is a surface modified porous material. The porous material can be a material such as activated carbon or silica. Preferably, the porous material has a pore volume of at least about 0.8 cc/g and average pore size of from about 1 to about 20 nm. The surface modification can include impregnating the porous material with one or more metal salts such as a metal salt selected from the group consisting of calcium chloride, lithium chloride, lithium bromide, magnesium chloride, calcium nitrate, potassium fluoride and the like. The porous support material is preferably loaded with from about 20 to about 80 weight percent of the metal salt and more preferably from about 40 to about 60 weight percent of the metal salt. Such desiccant compositions are described in detail in U.S. patent application Ser. No. 09/691,371, which is commonly-owned with the present application.

Figure 3:
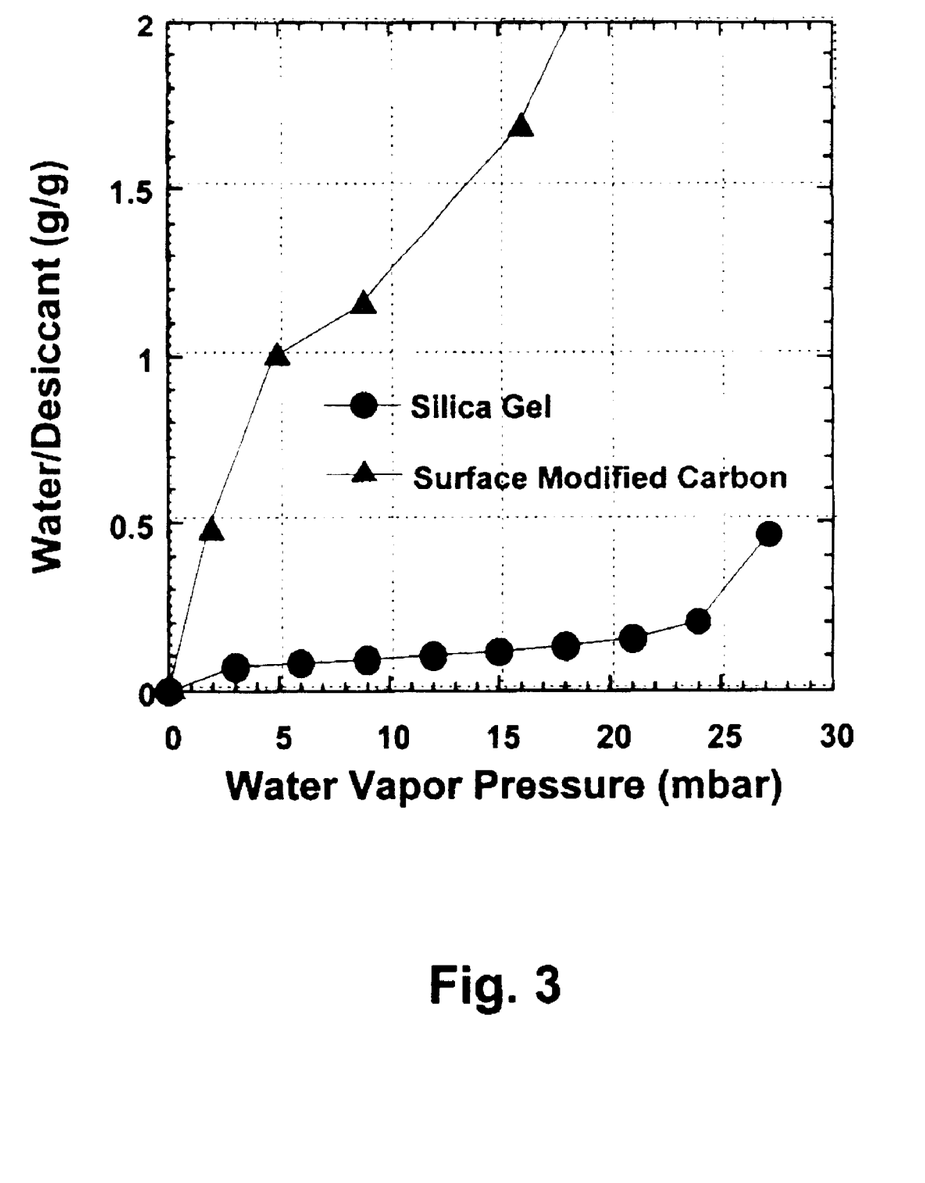
FIG. 3 illustrates a breathing apparatus incorporating a sorption cooling device according to an embodiment of the present invention.

FIG. 3 illustrates the capacity of a preferred desiccant according to the present invention to adsorb water at 24° C. compared to silica gel at various vapor pressures. The surface modified desiccant illustrated in FIG. 3 is a surface modified carbon. The desiccant is formed from activated carbon having lithium chloride impregnated on the activated carbon in a 1:1 mass ratio (i.e., 50 weight percent lithium chloride). To fabricate the desiccant, lithium chloride salt is dissolved in water and dried activated carbon is added to the solution. The solution is adsorbed into the activated carbon and is then dried, leaving the activated carbon impregnated with the lithium chloride. The process can be repeated to increase the loading of lithium chloride, if necessary. It can be seen from FIG. 3 that this desiccant has substantially higher water adsorption ability as compared to the silica gel. The use of desiccant compositions having such high adsorption capabilities enables the cooling unit to provide high cooling densities.

When the refrigerant liquid is water, the preferred desiccant preferably adsorbs at least about 50 percent of its weight in liquid at a water pressure of 5 mbar, more preferably at least about 75 percent by weight at a pressure of 5 mbar and even more preferably at least about 100 percent by weight at pressure of 5 mbar.

The preferred desiccant will also adsorb at least about 20 percent of its weight in water at 10 percent relative humidity, and at least 40 percent of its weight in water at 50 percent relative humidity and ambient temperature. More preferably, the desiccant will adsorb at least 40 percent of its weight at 10 percent humidity and 60 percent of its weight at 50 percent relative humidity. Even more preferably, the desiccant will adsorb at least about 60 percent of its weight at 10 percent humidity and at least about 80 percent of its weight at 50 percent humidity.

One of the problems associated with the adsorption of vapor on the desiccant is that the desiccant releases heat that is at least equal to the heat absorbed by the evaporative chamber. As the desiccant rises in temperature, its ability to capture vapor decreases and therefore the ability of the evaporative chamber to produce a cooling affect also decreases.

A preferred embodiment of the present invention addresses this problem by providing an improved adsorptive chamber. The adsorptive chamber advantageously provides improved contact between the vapor and the desiccant to reduce localized heating of the desiccant. The adsorptive chamber also provides means to actively cool the desiccant, such as by evaporative cooling.

Figure 4:
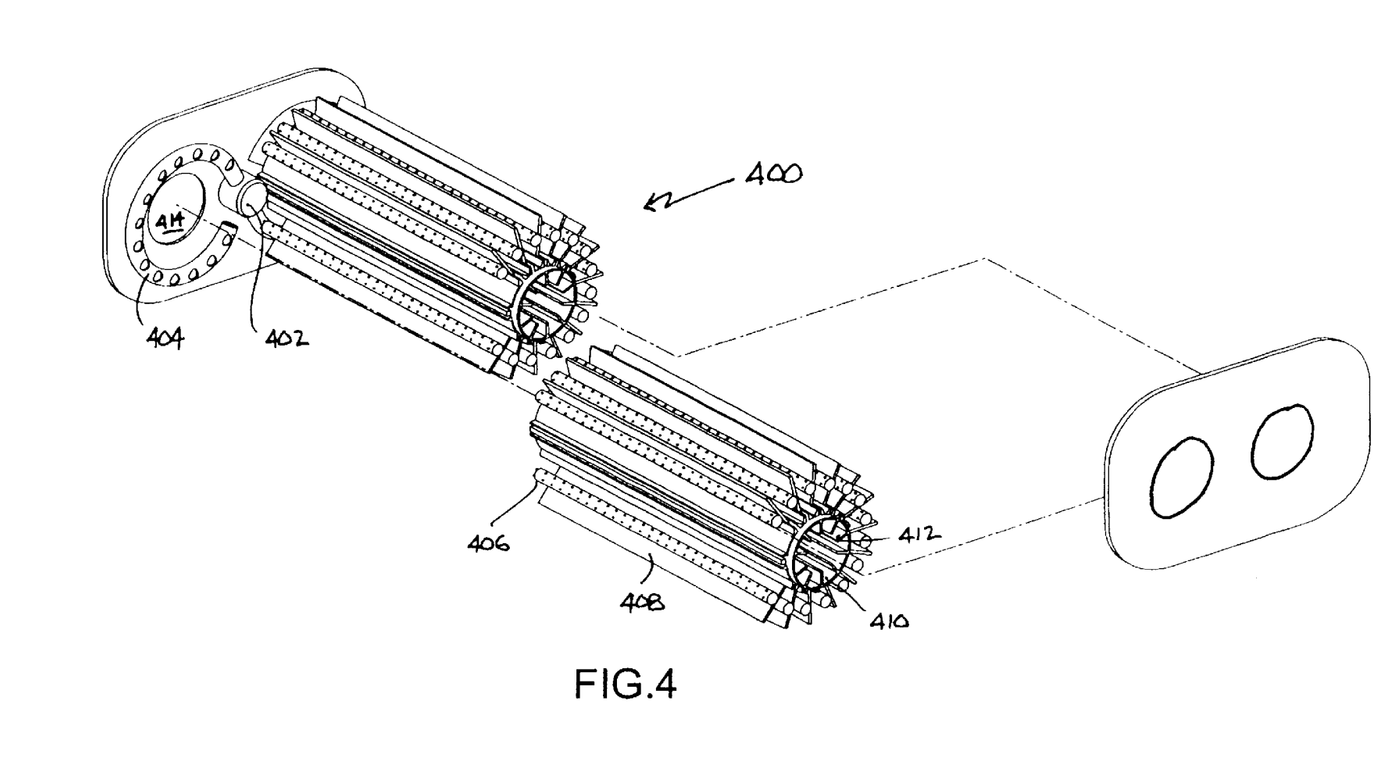
FIG. 4 illustrates an exploded view of an adsorptive chamber for a sorption cooling device in accordance with one embodiment of the present invention.

FIG. 4 illustrates an exploded view of an adsorptive chamber according to a preferred embodiment of the present invention. The adsorptive chamber 400 includes a vapor inlet 402 that is connected to the evaporative chamber of the device by a vapor passageway, thereby providing a conduit for the vapor to pass from the evaporative chamber to the adsorptive chamber. The vapor inlet 402 distributes the vapor to a vapor tube header 404. The vapor tube header 404 includes a number of outlets that are each connected to a vapor tube, such as vapor tube 406.

Figure 5:
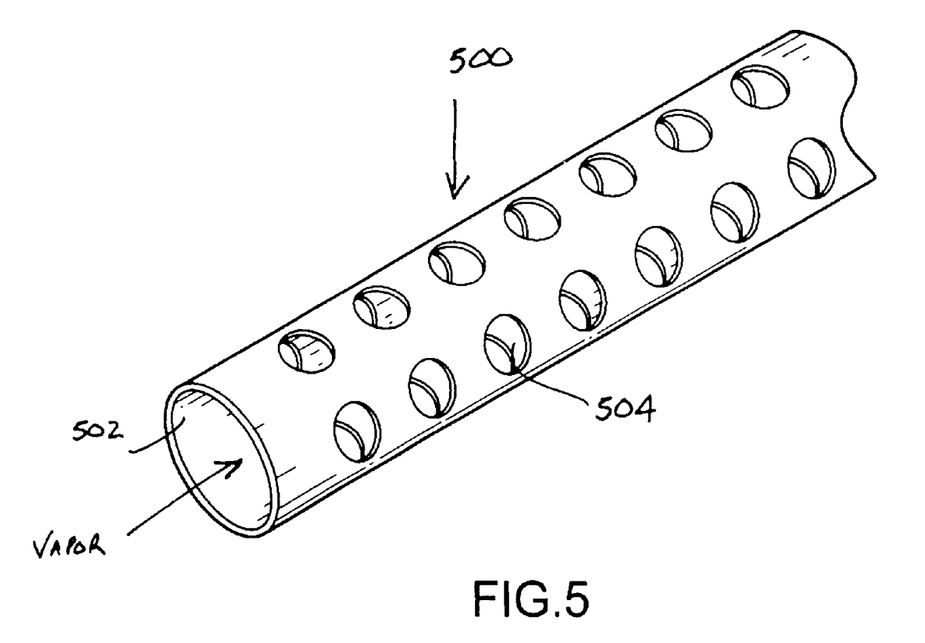
FIG. 5 illustrates a perspective view of a vapor tube that is useful in the adsorptive chamber illustrated in FIG. 4.

A vapor tube is illustrated in more detail in FIG. 5. The vapor tube 500 includes an inlet end 502 adapted to receive the flow of vapor from the vapor tube header. A plurality of apertures such as aperture 504 evenly distributes the vapor into the desiccant into which the vapor tube 500 is embedded. The opposite end of the vapor tube 500 is sealed such that the vapor must pass through one of the apertures. As a result, the vapor will be evenly distributed in the desiccant and the formation of "hot spots" in the desiccant will be minimized. The vapor tube 500 can be fabricated from virtually any material including metals such as copper.

Referring back to FIG. 4, the components of the adsorptive chamber are sealed in an airtight container and a desiccant (not illustrated) is packed into the adsorptive chamber. The vapor tubes are disposed within the desiccant to provide the even distribution of vapor to the desiccant. In order to reduce the temperature of the desiccant as vapor is adsorbed, cooling fins (e.g., cooling fin 408) are also disposed within the chamber 400. The vapor tubes are preferably disposed in close proximity to the cooling fins and, as illustrated in FIG. 4, each vapor tube can be disposed within an adjacent pair of cooling fins. The cooling fins are attached to a cooling core such as cooling core 410, and radiate outwardly therefrom to provide thermal conduction from the cooling fins to the cooling core. In one embodiment, the cooling core is provided with a wicking surface 412 on the interior surface of the cooling core 410. A liquid such as water can be placed in the wick surface 412 to facilitate cooling by evaporation. This liquid can be provided either from an additional reservoir or can be fed from the evaporant liquid reservoir at a rate sufficient to enhance the cooling of the desiccant by evaporation.

Further, the airflow through the cooling cores can be enhanced by providing a fan (not illustrated) disposed in an aperture 414 to increase airflow through the core. For example, a small battery-operated fan can be provided without adding substantially to the volume or mass of the device.

Figure 6:
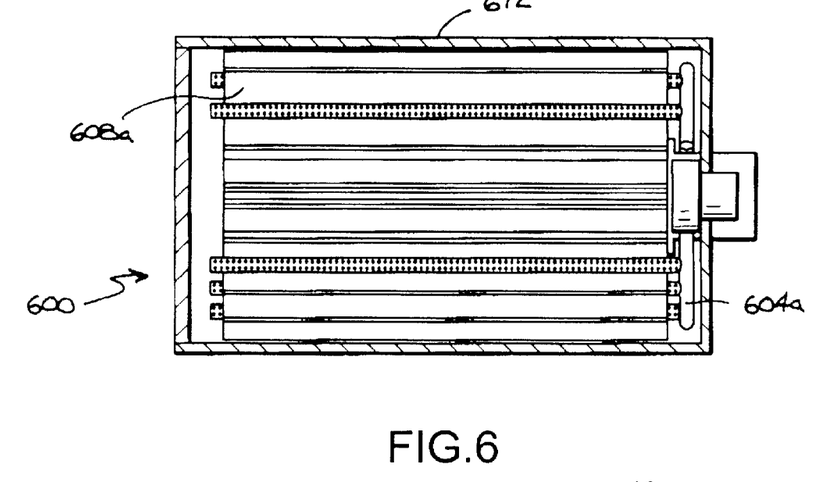
FIG. 6 illustrates a cross-sectional view of an adsorptive chamber for a sorption cooling device according to an embodiment of the present invention.
Figure 7:
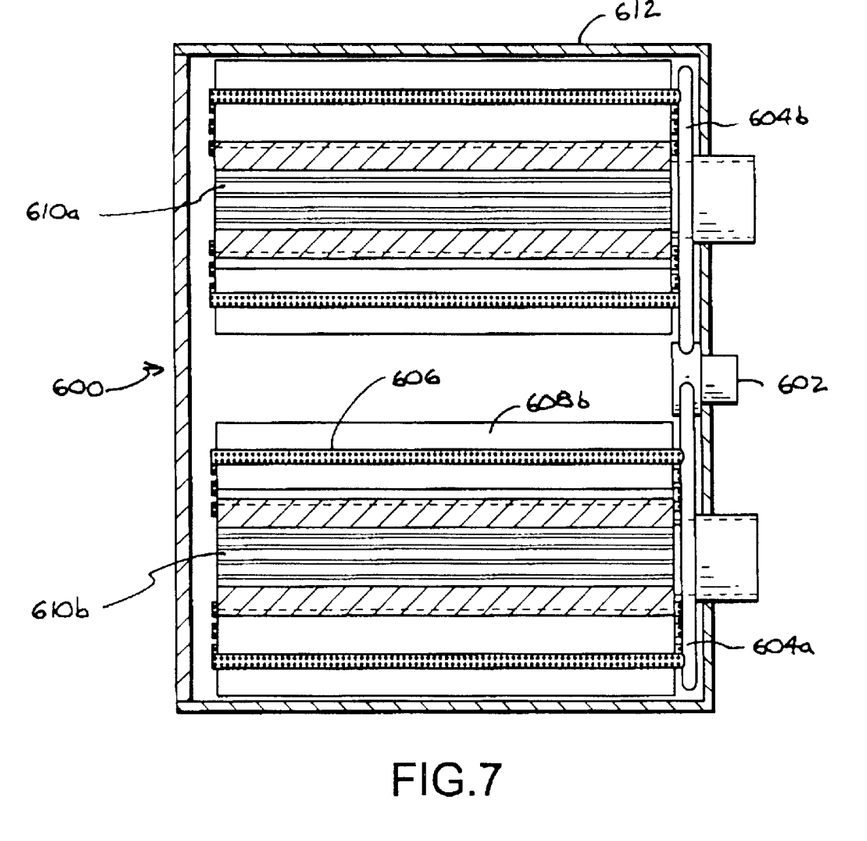
FIG. 7 illustrates a cross-sectional view of an adsorptive chamber for a sorption cooling device according to an embodiment of the present invention.

A cross-section of an adsorptive chamber according to the present invention is illustrated in FIGS. 6 and 7. The adsorptive chamber 600 includes a vapor inlet 602 disposed at the bottom of the adsorptive chamber 600. The vapor inlet 602 is connected to vapor tube headers 604a and 604b and each vapor tube header is connected to a plurality of vapor tubes, such as vapor tube 606, for distributing the vapor to the desiccant that is packed around the vapor tubes.

In order to cool the desiccant according to one embodiment of the present invention, at least one cooling structure is provided that includes cooling fins (e.g., cooling fins 608a and 608b) and a cooling core 610a and 610b. The cooling core can include a wick surface to hold a liquid and facilitate cooling of the device. The entire structure is enclosed in an airtight container 612.

Figure 8:
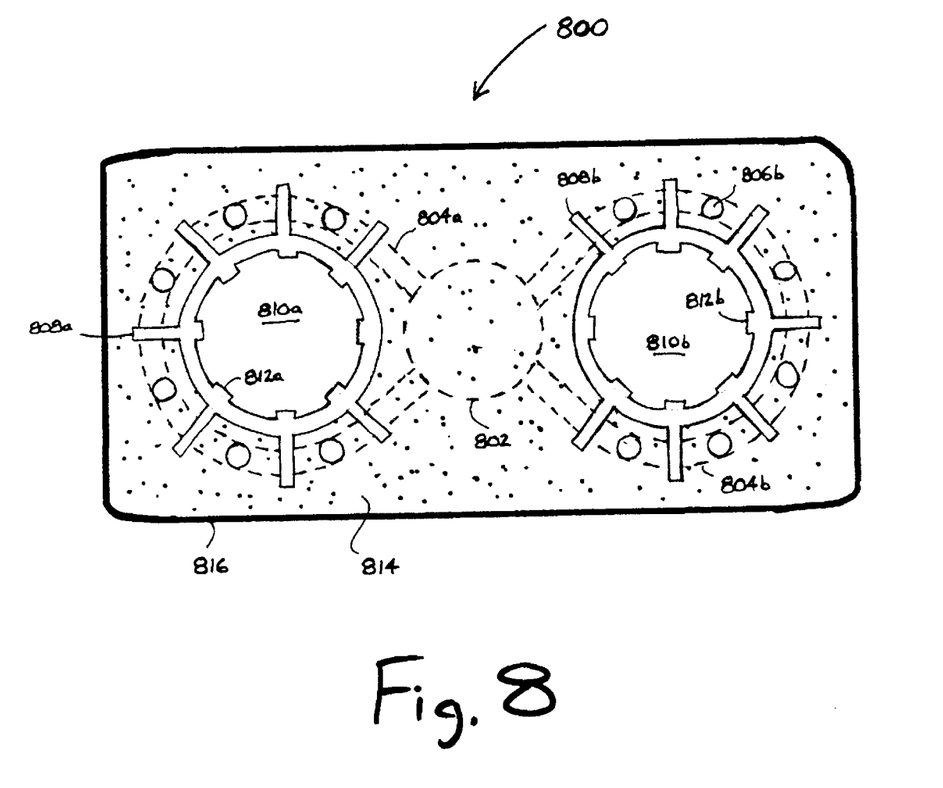
FIG. 8 illustrates a cross-sectional view of an adsorptive chamber for a sorption cooling device according to an embodiment of the present invention.

A further cross-sectional view of an adsorptive chamber according to the present invention is illustrated in FIG. 8. The adsorptive chamber 800 includes a vapor inlet 802 disposed at the bottom of the adsorptive chamber. The vapor inlet 802 is connected to vapor tube headers 804a and 804b.

Each vapor tube header includes a plurality of vapor tubes, such as tubes 806a and 806b. The vapor tubes are disposed in a desiccant 814 that is packed within the container 816.

In order to cool the desiccant 814 according to this embodiment, at least one cooling structure is provided that includes cooling fins (e.g., cooling fins 808a and 808b) and a cooling core 810a and 810b. The cooling core can include, for example, a wick surface 812a and 812b to hold a liquid and facilitate cooling of the device.

It will be appreciated that although the foregoing adsorptive chambers have been illustrated with two cooling structures disposed in the chamber, only one such structure or many such structures can be utilized depending on the application of the cooling device. Further, it will be appreciated that other active cooling means can be utilized to cool the desiccant. For example, the desiccant can be cooled using fans, either alone or in conjunction with heat sinks, and by forced or free evaporation of liquid from a wick which is in contact with the desiccant chamber. For example, a wick could be in the form of a flat plate which constitutes one side of the desiccant chamber.

According to one embodiment of the present invention, the sorption cooling unit is disposable. That is, the sorption cooling unit can be adapted to be used in a breathing apparatus and then thrown away. Alternatively, the sorption cooling unit can be partially or wholly recyclable and/or regenerable. In order to recycle the sorption cooling unit, the desiccant in the adsorptive chamber must be regenerated or replaced. Regeneration of the desiccant to entails removing liquid from the desiccant by either heating the desiccant, subjecting the desiccant to a vacuum or both. Further, additional liquid must be provided to the sorption cooling unit for subsequent use. Thus, the liquid reservoir can be detachable wherein the empty reservoir is removed after use and replaced with a fresh reservoir. In one embodiment, the liquid reservoir is a flexible pouch (e.g., a polymer pouch) that is adapted to be attached to the cooling device and provide refrigerant liquid to the evaporative chamber. A flexible pouch will also reduce the working volume of the device. That is, by utilizing a flexible pouch containing refrigerant liquid such as water, the device will take up its maximum volume and weight only when it is initially activated, after which it will shrink as the liquid is consumed. By eliminating a permanent large and rigid structure to hold the liquid, which must also be able to contain a vacuum, the size and volume of the device can be significantly reduced. Utilizing a separate water reservoir also enables the implementation of a modular system, wherein evaporant and desiccant cartridges can be removed and replaced to provide continued operation.

The desiccant can be regenerated either by removing the desiccant from the unit or by regenerating the desiccant in-situ. For example, the entire sorption cooling unit can be returned to the manufacturer where it is dismantled and the desiccant is removed and regenerated for use in new cooling units. Alternatively, the adsorptive chamber can be designed as a removable piece of the sorption cooling device. This piece would then be returned and the desiccant removed and regenerated as described above. Regenerated desiccant can then be placed in new desiccant packs that can be packaged and placed into existing units. According to yet a further embodiment, the adsorptive chamber can be regenerated in-situ by opening a valve in the unit and placing the entire unit in either an oven or a vacuum. Also, an integral heating unit can be provided with the adsorptive chamber whereby the heating unit can be activated to regenerate the desiccant in-situ.

The sorption cooling device according to the present invention has a high cooling density—that is, a high degree of cooling per unit volume or mass. Specifically, the cooling device preferably has a cooling density of at least about 400 J/g (joules per gram), more preferably at least about 600 J/g and even more preferably at least about 800 J/g, where the mass is the mass of the refrigerant liquid plus the mass of the desiccant.

Figure 9:
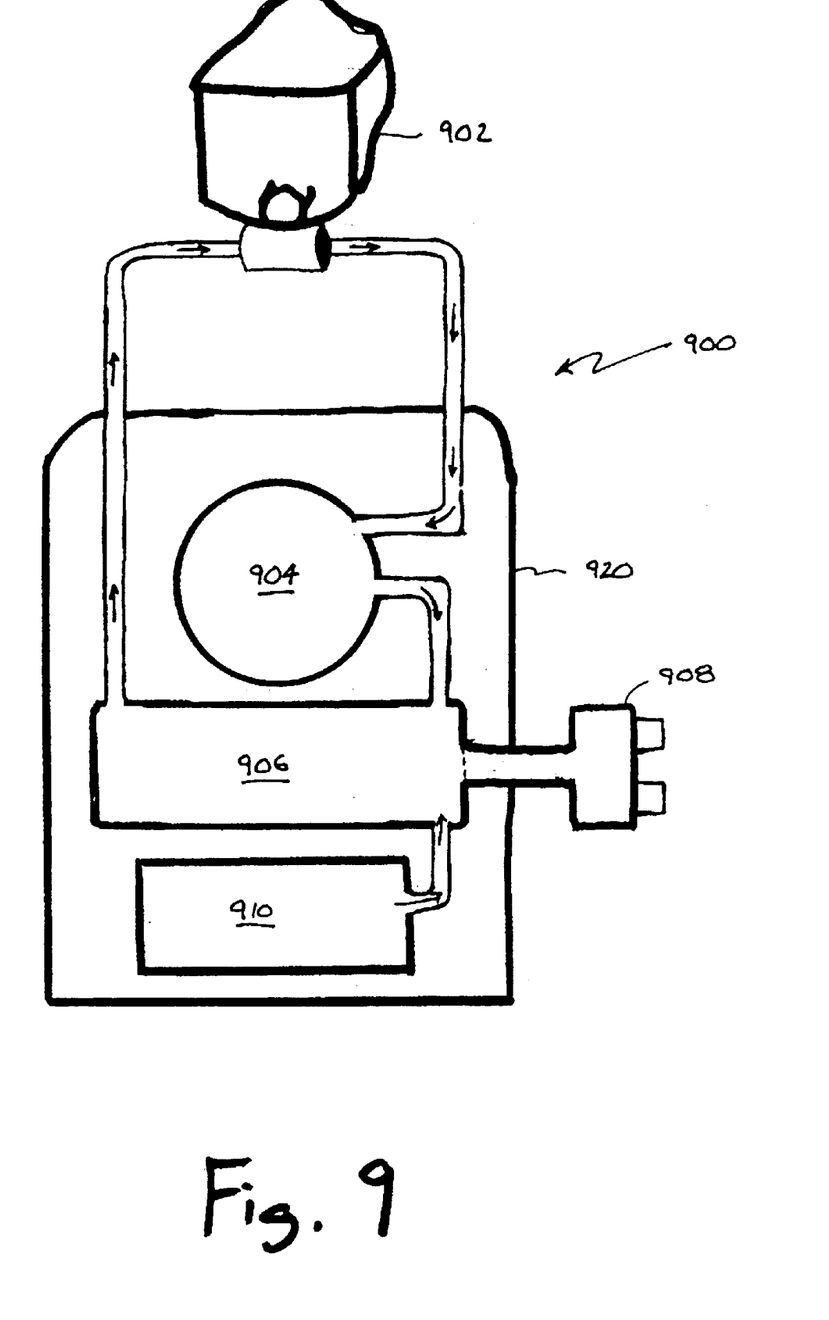
FIG. 9 illustrates the adsorption capacity of two different desiccants that are useful in accordance with the present invention.

As is discussed above, the cooling device can be incorporated into a breathing apparatus and such a closed-loop breathing apparatus is illustrated in FIG. 9. The breathing apparatus 900 includes a mask 902 that is adapted to provide breathable air to a user. The remainder of the system can be enclosed in a backpack 920 or similar structure. In a closed-loop system, the gas exhaled by the user is routed to a carbon dioxide absorber 904 where a $CO_2$ absorbent (e.g., soda lime) removes the $CO_2$. The absorption process generates heat in the $CO_2$ absorber 304, further heating the gas.

The gas is then routed to a sorption cooling device 906 such as the device illustrated in FIG. 2. Make-up oxygen can be supplied by an oxygen tank 910 to mix with the recycled gas and form a breathable gas mixture that is supplied to the mask 902. The oxygen can be mixed with the recycled gas before, after or within the cooling device 906, but is preferably mixed before or in the cooling device.

The vapor from the cooling device is routed to an adsorptive chamber 908, such as that illustrated in FIGS. 4–7 above. The adsorptive chamber 908 is preferably mounted on the exterior of the backpack 920 so that excess heat generated by the adsorption process is dissipated to the external atmosphere.

Figure 10:
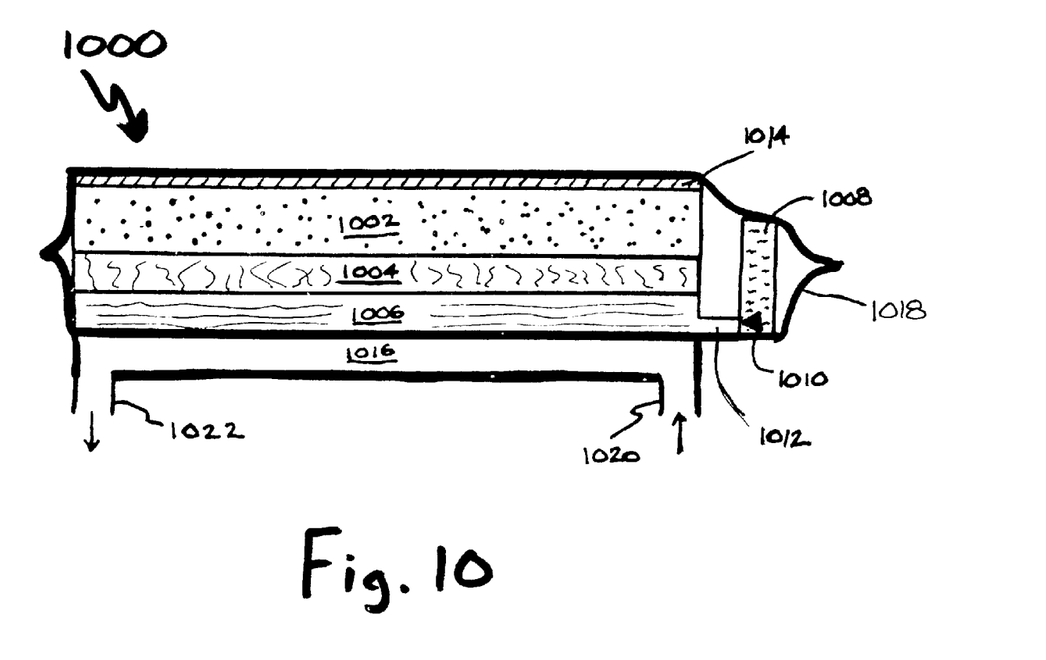
FIG. 10 illustrates a cross-sectional view of a sorption cooling device for cooling a flowing medium according to an embodiment of the present invention.

A cooling device according to another embodiment of the present invention is illustrated in FIG. 10. This device 1000 integrates a cold-side heat exchanger into the cooling device for heat exchange between the evaporator and the working fluid, all within a flexible film package. Advantages of this embodiment include a reduced total system weight and cost, as well as a simplification of the overall device construction.

The cooling device 1000 includes several components: an adsorptive chamber having a desiccant pouch 1002, including a desiccant disposed within the pouch; a vapor pathway 1004; an evaporative chamber including an evaporator 1006 and a wicking material disposed therein; a liquid reservoir 1008 with refrigerant liquid disposed therein; an activating mechanism 1010; a liquid channel 1012; a thermal contact plate 1014; an integrated cold-side heat exchanger 1016 which also functions as the working fluid conduit, with ports 1020 and 1022 for the flow of a working gas or liquid to be cooled; and an outer barrier bag 1018.

The desiccant pouch 1002 is fabricated from a vapor permeable material that contains the desiccant as well as any dust and fines within the desiccant. The pouch 1002 may be constructed from any number of fabrics, papers or non-woven materials. Spunbonded polypropylenes (such as those available from Remay Inc., Old Hickory, Tenn.) are a suitable material which can be heat-sealed to contain the desiccant.

The vapor pathway 1004 forms a free vapor path from the evaporator 1006 to the desiccant pouch 1002 and physically separates the evaporator 1006 from the desiccant pouch 1002 so that liquid will not travel directly from the evaporator 1006 to the desiccant. The vapor pathway 1004 should have a very open cross section in order to minimize the resistance to the flow of vapor from the evaporator 1006 to the desiccant.

The evaporator 1006 includes a wicking material that spreads liquid evenly across the evaporator surface, while maintaining good thermal contact with the integrated cold-side heat exchanger 1016. It may be advantageous to bond the wicking material to the inner surface of the outer barrier bag, which also defines the innermost surface of the integrated cold-side heat exchanger 1016. The liquid channel 1012 contacts the wicking material and separates the wicking material from the liquid reservoir 1008.

The liquid reservoir 1008 in which the refrigerant liquid is contained is fabricated from an impermeable material. When the activation mechanism 1010 is actuated, the refrigerant liquid is released and flows through the liquid channel 1012 into the evaporator 1006. The activation mechanism 1010 may be of a single use style (i.e., the device may only be actuated once and cannot be turned off again until the liquid is depleted), or of an on/off style which can release refrigerant liquid and also terminate the flow of refrigerant liquid on demand.

The liquid channel 1012 can include a restriction to limit the flow rate of liquid to the evaporator 1006. This allows for liquid flow at a fixed rate and also allows for good physical contact between the refrigerant liquid and the wicking material in the evaporator 1006.

The thermal contact plate 1014 is a thin plate of metal or some other highly thermally conductive material. The purpose of this plate is to provide good thermal contact between the desiccant and the outer barrier bag 1018. This plate 1014 also creates a flat surface with good thermal contact for an external heat hot-side exchanger (not illustrated) that-can be attached to the outside of the outer barrier bag 1018.

The integrated cold-side heat exchanger 1016 can include a system of channels or conduits which are formed by heat sealing portions of film defining the sidewalls of the flow conduits to the outer barrier bag, leaving a liquid flow path from the inlet port 1020 to the outlet port 1022. This flow path is designed to provide even flow across the cold-side heat exchanger surface, and to provide optimal contact area with the adjacent evaporator surface. The inlet and outlet ports, as well as the entire cold-side heat exchanger 1016 are integrally affixed to the outer barrier bag 1018, such as by heat seal or RF welded connection. The cold-side heat exchanger 1016 is joined to the outer barrier bag 1018 in such a way that the fluid within the heat exchanger 1016 cannot enter the barrier bag 1018 containing the other components (i.e., the desiccant, evaporator and vapor pathway). The outer barrier bag 1018 surrounds all of the other components and is evacuated and sealed at a moderate vacuum level such as less than 5 mbar, while the fluid in the cold-side heat exchanger which flows through the ports will remain at near ambient pressure.

Figure 11:
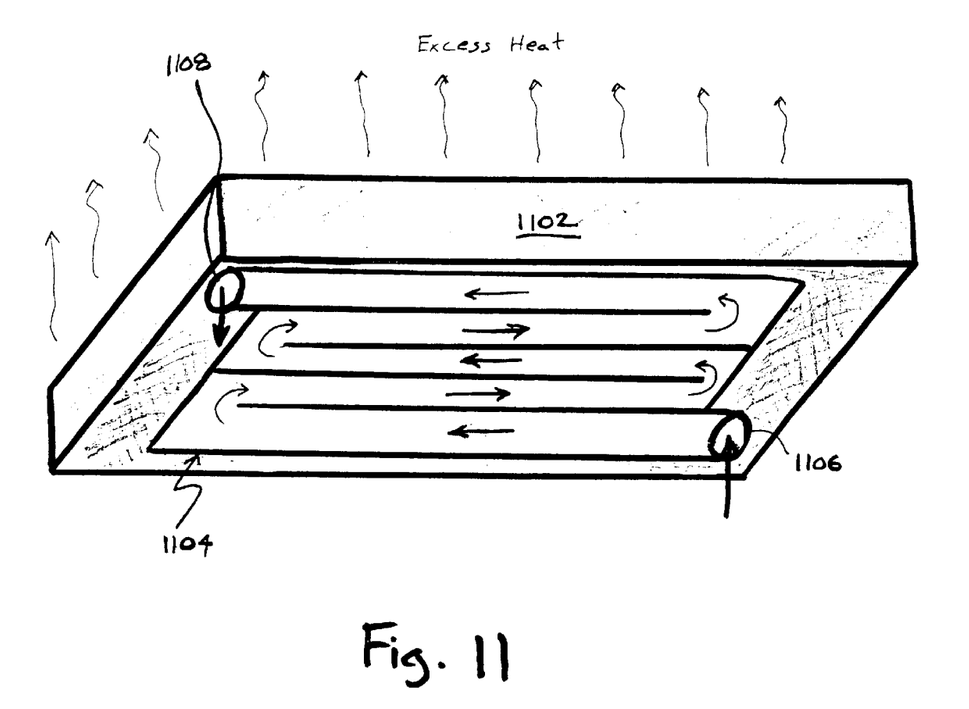
FIG. 11 illustrates a perspective view of a sorption cooling device for cooling a flowing medium according to an embodiment of the present invention.
Figure 12:
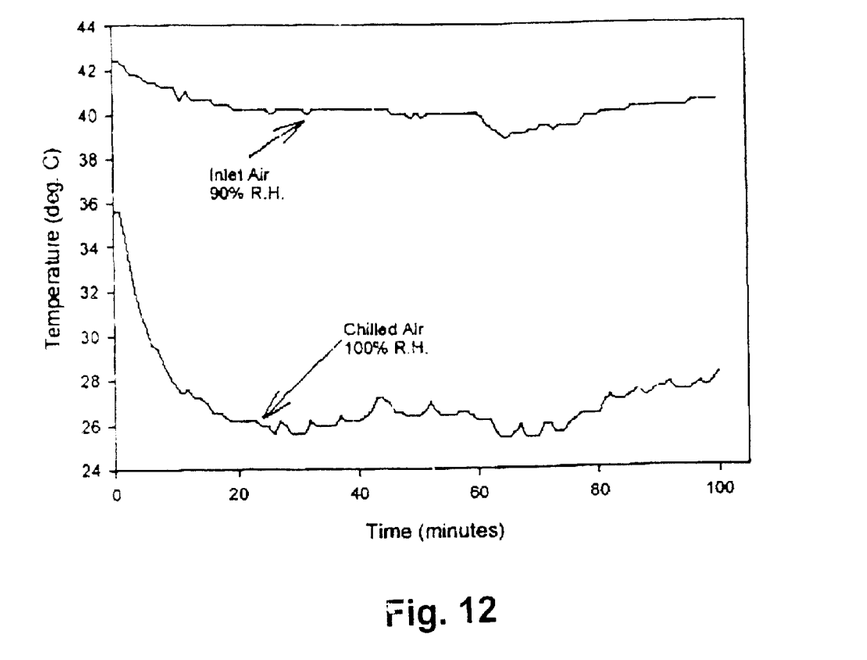
FIG. 12 illustrates the gas stream cooling ability of a sorption cooling device according to the present invention.

An alternative view of a device in accordance with this embodiment of the present invention is illustrated in FIG. 11. For simplicity, the cooling device components enclosed within the outer barrier bag are illustrated as a simple box 1102. As illustrated in FIG. 11, the adsorptive chamber is located at the top of the box 1102 as indicated by the heat leaving the device. On the opposite side of the device is the cold-side heat exchanger 1104. The cold-side heat exchanger 1104 includes an inlet port 1106 and an outlet port 1108. The cold-side heat exchanger 1104 is sealed against the outer barrier bag in a manner to create flow conduits between the ports, the innermost wall of the flow conduits being defined by the outer barrier bag adjacent to the evaporator. The cold-side heat exchanger 1104 as well as the outer barrier bag 1018 can be constructed from a vapor impermeable film, such as metallized polyester. The flow conduits are in intimate thermal contact with the evaporator in order to provide adequate cooling for the medium flowing through the conduits. As is discussed above, the cold-side heat exchanger 1104 can be formed by heat sealing portions of the outer barrier bag and the heat exchanger films together in a manner to form the liquid flow path.

EXAMPLES

Several tests were conducted using the sorption cooling device substantially as illustrated in the Figures. The desiccant in each example comprised 50 weight percent lithium chloride (LiCl) dispersed on an activated carbon support.

Example 1

The initial air gas stream had a temperature of 40° C. and was flowed in contact with the sorption cooling device at a rate of about 40 liters per minute. The test was run for 40 minutes and the results are illustrated in FIG. 10. During the test a total of 106 grams of water was evaporated and adsorbed in the adsorptive chamber. Based on the amount of water evaporated, it was calculated that the average cooling was just over 44 watts. The observed temperature data are reasonably consistent with this calculation. Taking into account the effect of humidity, the temperature data imply a cooling rate in the range of from about 50 to about 60 watts. The difference between the two values can be attributed to heat loss from the hot air to ambient.

It should be noted that a total of 360 grams of desiccant was used in this example and no water was used to enhance the heat transfer from the interior surfaces of the cooling core. Taking the mass of desiccant into account, the cooling density was about 570 J/g or about 1.7 times the cooling density of ice. However, the test was stopped well before the desiccant capacity was reached and therefore higher cooling densities are certainly obtainable.

Example 2

Figure 13:
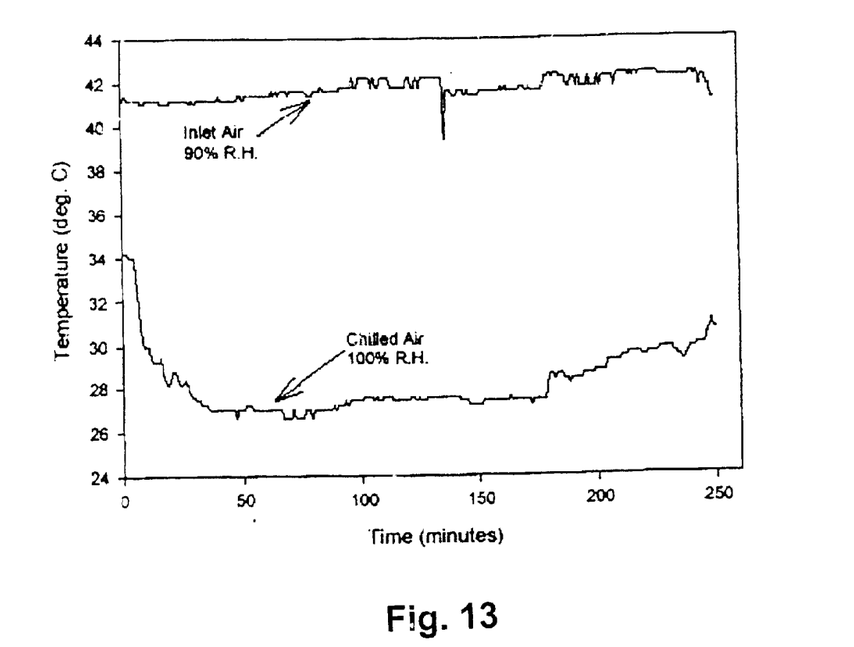
FIG. 13 illustrates the gas stream cooling ability of a sorption cooling device according to the present invention.

In this test, the same cooler was run for four hours and provided an average cooling rate of 35 watts based on 203 grams of water consumed. The total desiccant mass was 372 grams. During the test, 55 grams of water was used to provide desiccant cooling. The results of this test are illustrated in FIG. 13. Some degradation of the cooling performance is evident near the end of the test, but it is clear the considerable cooling potential yet remains. Using only the data collected, however, yields a cooling density of 806 J/g, which is over 2.4 times the cooling density of ice.

What is claimed is:

1. A cooling device adapted to cool a flowing medium, comprising:
   a) an evaporative chamber;
   b) a refrigerant liquid disposed within said evaporative chamber;
   c) an adsorptive chamber;
   d) a vapor passageway disposed between said evaporative chamber and said adsorptive chamber;
   e) an outer barrier bag surrounding said evaporative chamber, said adsorptive chamber and said vapor passageway adapted to maintain a reduced pressure within said bag; and
   f) a heat exchanger sealed to said outer barrier bag and defining at least a flow conduit in thermal communication with said evaporative chamber, wherein a medium flowing through said conduit can be cooled during operation of said device.

2. A cooling device as recited in claim 1, wherein said heat exchanger is fabricated from a flexible vapor impermeable film.

3. A cooling device as recited in claim 1, wherein said heat exchanger is fabricated from a flexible metallized film.

4. A cooling device as recited in claim 1, wherein said heat exchanger is fabricated from metallized polyester.

5. A cooling device as recited in claim 1, wherein said outer barrier bag is fabricated from a flexible vapor impermeable film.

6. A cooling device as recited in claim 1, wherein said outer barrier bag is fabricated from a flexible metallized film.

7. A cooling device as recited in claim 1, wherein said outer barrier bag is fabricated from metallized polyester.

8. A cooling device as recited in claim 1, wherein said heat exchanger is heat sealed to said outer barrier bag.

9. A cooling device as recited in claim 1, wherein at least a portion of said flow conduit is defined by said outer barrier bag.

* * * * *